Feb. 7, 1967  J. N. BINNS ETAL  3,302,499
APPARATUS FOR CHUCKING WORKPIECES
Filed Oct. 4, 1963  2 Sheets-Sheet 2

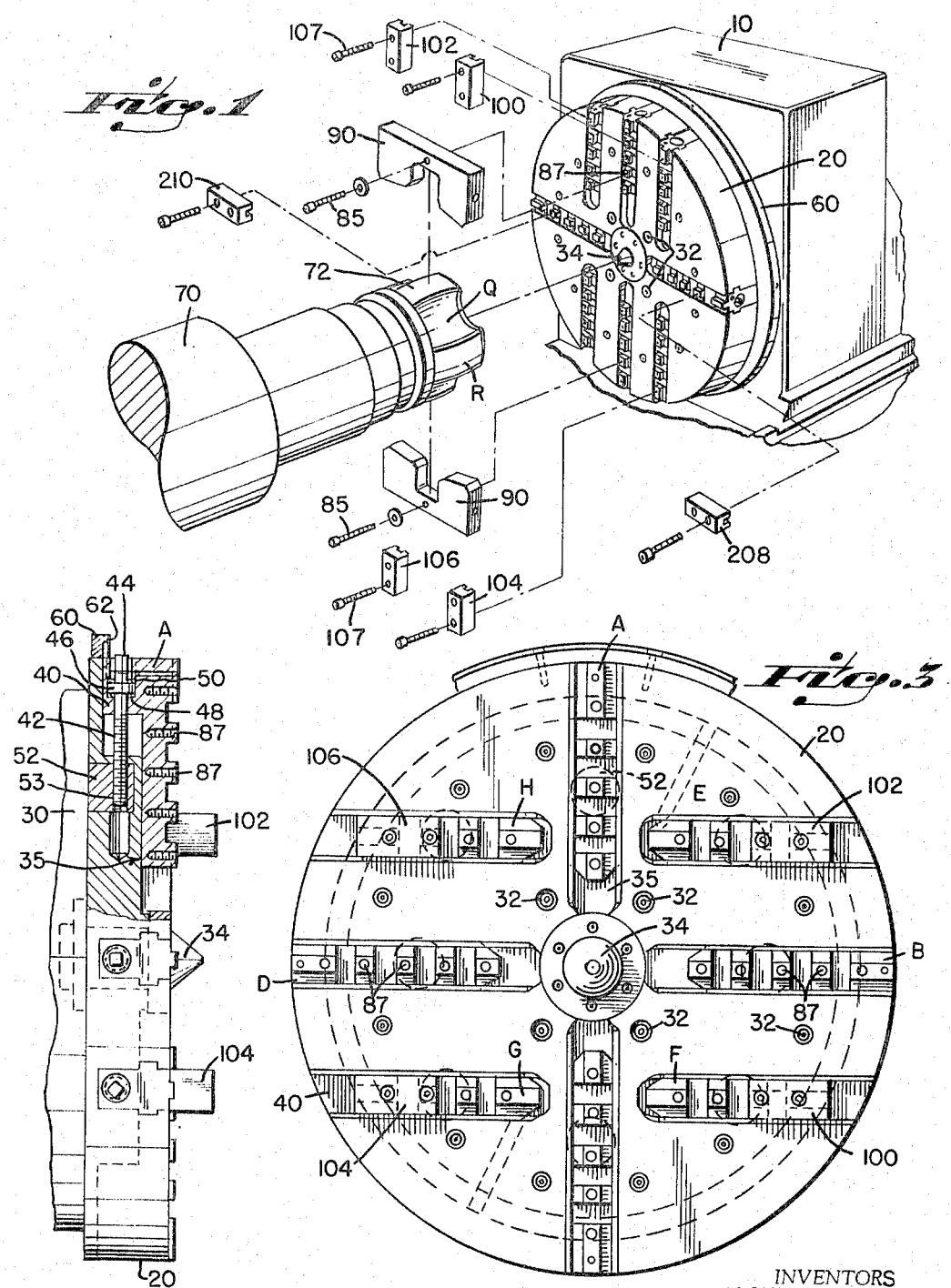

INVENTORS
JACK N. BINNS
CARL E. CLUTTER
ROGER G. HEATON
BY Kinney & Schenk
ATTORNEYS

3,302,499
APPARATUS FOR CHUCKING WORKPIECES
Jack N. Binns, 4886 Oaklawn Ave., Cincinnati, Ohio 45227, and Carl E. Clutter, Mason, and Roger G. Heaton, Amelia, Ohio; said Clutter and said Heaton assignors to said Binns
Filed Oct. 4, 1963, Ser. No. 313,866
14 Claims. (Cl. 82—40)

This invention is directed to means for eliminating torsional backlash and minimizing jaw deflection in a heavy-duty high-torque lathe chuck.

An object of the invention is to provide a heavy-duty high-torque capacity chuck, which provides a positive drive transmitted from the driving to the driven member without resorting to frictional transmission means.

Another object of the invention is to provide a chuck, having the hereinabove described characteristics which includes four or more radial jaws which are used for centering and/or four or more offset jaws for effecting a positive drive of a heavy workpiece, without backlash.

A primary object of the invention is to provide a heavy-duty high-torque capacity chuck which is characterized in that it effectively prevents torsional oscillation and minimizes angular deflection.

Still a further object of the invention is to provide a chuck having the means hereinabove mentioned which enables a workpiece to be accurately mounted for turning whether or not said workpiece is provided with a centering hole, in its driven end.

Still another object of the invention is to provide a heavy-duty high-torque capacity chuck, which includes adapters designed to selectively engage the torque transmitting contours of the splined end or wabbler of a workpiece whereby to apply a driving torque to the workpiece at a location remote from the center thereof in such a manner that no chuck jaw is subjected to transverse load applied in the direction of least rigidity of the chuck jaws.

Stated differently, an object of the invention is to provide simple yet highly effective means for chucking and driving a workpiece at the greatest distance from its center (maximum periphery) whereby the workpiece may be driven utilizing the least amount of torque force and whereby the chuck jaws act in their stiffest, most stable direction, without relying on friction for driving the workpiece.

The jaws are therefore applied to the workpiece in a manner in which the jaws act with greatest rigidity and stability.

Still a further object of the invention is to teach a method of chucking a workpiece having a splined driven end or wabbler to prevent torsional oscillation and minimize angular deflection. These and other objects are attained by the means described herein and as disclosed in the accompanying drawings, in which:

FIG. 1 is an exploded view illustrating, in perspective, the splined end of a workpiece and its relationship to a heavy-duty high-torque capacity chuck of the present invention.

FIG. 2 is a side view of FIG. 3 with portions thereof being broken away for clarity of detail and understanding.

FIG. 3 is an enlarged front plan view of the chuck of FIG. 1.

Figure 4:
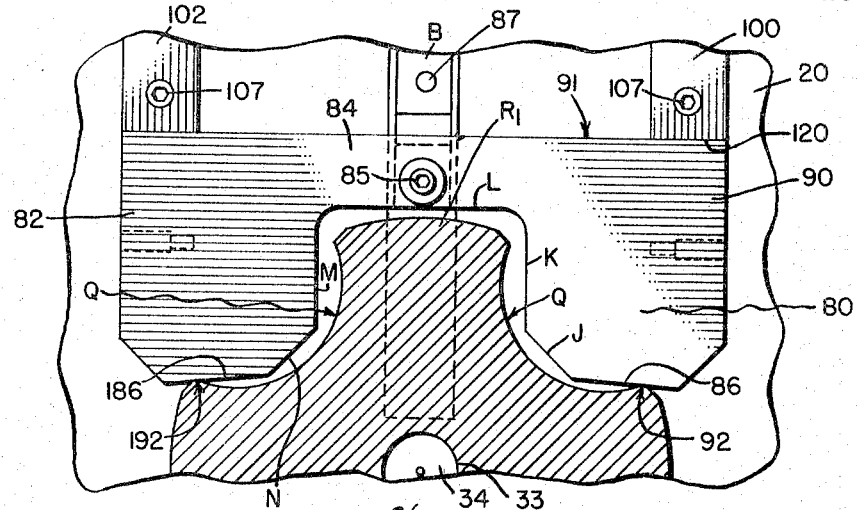
FIG. 4 is an enlarged sectional view illustrating a fragmental portion of the splined end of a driven workpiece and its relationship with an adapter plate and the offset jaws of the chuck of FIG. 1.

With particular reference now to FIG. 1, the numeral 10 denotes generally a conventional head stock of a lathe, and in particular of a heavy duty lathe construction, such as, by way of example, is illustrated in my U.S. Patent No. 3,022,690 dated February 27, 1962.

At the outset, it should be clearly understood that this invention is neither concerned with nor directed to the particular structural details of head stock 10 nor the driving means therefor.

The numeral 20 denotes a chuck body which is rigidly, though releasably mounted to a face plate or spindle 30 by means of suitable fasteners 32 which, if desired, may be bolts, whereby chuck body 20 will rotate with spindle or face plate 30 and in precise concentricity therewith.

The numeral 34 denotes a conventional center which may be fixed or removable.

As best illustrated in FIGS. 1, 2 and 3, chuck body 20 is provided with four radial sliding jaws, A, B, C and D and four offset sliding jaws E, F, G and H. It should be understood that each of the jaws A through H may be slidably mounted in slots provided in body 20.

As best illustrated in FIG. 2, jaw A is mounted for radial movement in slot 35 by means of an ear 40 through which the upper or shank end of a screw 42 projects. The upper or shank end of said screw is headed as at 44. A shoulder 46 on screw 42 has opposite axial faces which engage thrust washers 48 and 50, respectively, which translate axial movement of screw 42 to radial linear motion of jaw A.

A circular nut 52 is loosely received within a corresponding opening provided in body 20, said nut having an internally threaded transverse bore engageable by the threaded end portion 53 of screw 42.

The numeral 60 denotes generally a shroud ring having an overhanging rim 62 which projects outwardly over the outer ends of the jaws which are carried by body 20 whereby to preclude the accidental, unintentional or inadvertent disassociation of a jaw from the chuck body.

With particular reference now to FIG. 1, the numeral 70 denotes a workpiece, the driven end of which terminates in a splined end or wabbler 72. The particular wabbler construction illustrated in FIGS. 1, 4, 5 and 6 consists of four pods, splines or slots Q which define the four radial lugs R.

With particular reference now to FIG. 4, it will be noted that splines Q which are disposed on opposite sides of lug $R_1$ are received within and between legs 80 and 82 of an adapter element 90. Legs 80 and 82 are rigidly interconnected by means of intermediate leg or connector portion 84. The legs 80 and 82 terminate in free edges or faces 86 and 186 providing bearing areas which are adapted to abuttingly engage bearing portions or areas 92 and 192 respectively of the wabbler.

Adapter element 90 is loosely secured to a radial jaw such as B or D by means of a bolt 85 which threadably engages one of the bolt holes 87 of sliding jaws B or D. The purpose of this connection is merely to prevent the adapter element 90 from becoming accidentally or unintentionally disassociated from the chuck body incident to insertion and/or removal of a workpiece.

In the preferred embodiment of the invention, interior surfaces J, K, L, M and N of the adapter element 90 clear and remain out of engagement or contact with adjacent portions of the lug and spline of the wabbler, as best illustrated in FIG. 4. In passing, it will be noted that the end of the workpiece illustrated in FIG.

4 is provided with a center hole 33 into which center 34 of the face plate or spindle is received for accurately effecting axial alignment of the center of the workpiece with the center of rotation of the chuck body.

Rotation of chuck body 20 in a clockwise direction will result in the application of a torque force at 92 through the bearing edge or face 86 of adapter element 90.

With reference again to FIGS. 1 and 3 the numerals 100, 102, 104 and 106 indicate removable jaws which are secured to and carried by slidable jaws E, F, G and H to which they are securely through releasably attached by suitable means such as bolts 107.

Removable jaw 100 has a transverse face 120, see FIG. 4, which abuttingly engages an outer transverse face or butt 91 of the adapter element 90 whereby to apply a torque force from chuck body 20 to the adapter element 90 thence to bearing area 92 of the workpiece. Bearing area 92 is seen to be located as remotely as possible from the axis of rotation of the wabbler.

Bearing area 186 of leg 82 of the adapter element 90 engages bearing portion 192 of the wabbler by reason of a force applied by removable jaw 102 for precluding play and thereby eliminating angular backlash. Assuming a clockwise rotation of the wabbler, 92 constitutes the trailing bearing area of a wabbler lug, and 192 constitutes the leading bearing area of the opposite lug. Each lug has a leading bearing area and a trailing bearing area, both such bearing areas being adjacent to the free end of the lug.

Figure 5:
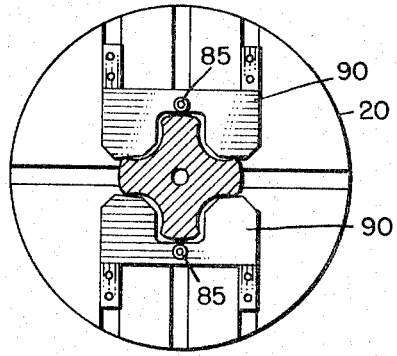
FIG. 5 is a view similar to FIG. 4 on a reduced scale illustrating the entire chuck and the manner of mounting and driving the wabbler of a workpiece.

FIG. 5 differs from FIG. 4 in that in FIG. 5 two sets of adapter elements 90 are illustrated for effecting a balanced force construction, it being understood that FIG. 4 is an enlarged detail of the upper portion only of FIG. 5 for clarity of detail and understanding.

It will, of course, be evident that the bearing areas 92 and 192 and the corresponding opposite bearing areas follow a circular path in the rotation of the workpiece and that the legs of the adapter element apply clamping forces upon the lugs R along parallel chords of the said circular path and which chords are spaced at opposite sides of the axis of rotation of the chuck body.

Figure 6:
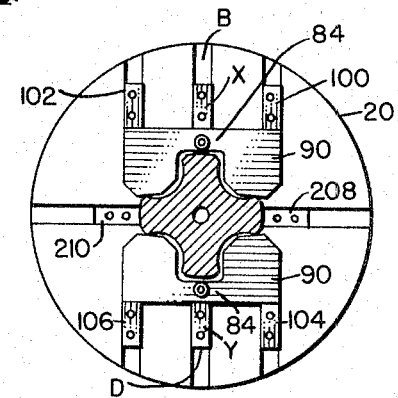
FIG. 6 is a view similar to FIG. 5 showing an alternate construction.

FIG. 6 differs from FIG. 5 in that a pair of removable jaws X and Y similar in construction to jaws 100–106 are secured to and carried by slidable radial jaws B and D for applying a supplementary force to increase the rigidity of leg 84 of adapter element 90.

Figure 7:
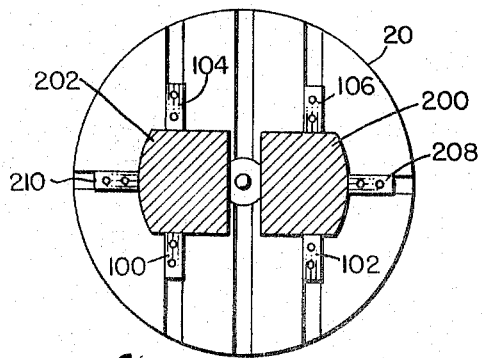
FIGS. 7 and 9 are views similar to FIG. 5 showing the invention applied to workpieces having different forms or shapes of wabbler construction.

In FIG. 7 we have illustrated the manner in which a workpiece which does not have a center hole and which, by way of example terminates in a spade wabbler terminating in laterally spaced legs 200 and 202 may be mounted relative to the chuck body.

Removable jaws 100 and 102 (FIG. 7) are initially positioned to support the wabbler after which jaws 104 and 106 are advanced to secure the end of the workpiece as shown. Thereafter radial jaws 208 and 210 are selectively advanced to engage the lug ends of the wabbler as shown, for shifting the workpiece laterally. The chuck body may then be rotated, and the workpiece and jaws 100, 102, 104, 106, 208 and 210 thereafter adjusted until the workpiece is centered with the driving spindle.

Figure 9:
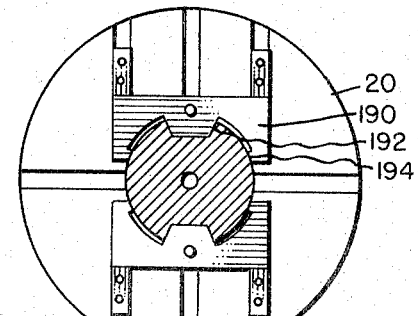

In FIG. 9 a so-called two-lug wabbler has been illustrated.

Figure 8:
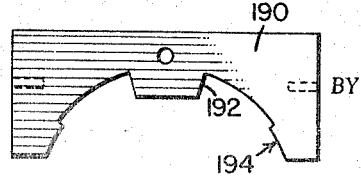
FIG. 8 is an end view of a modified form of adapter as illustrated in FIG. 9.

In FIG. 8 the numeral 192 indicates the driving face, and 194 the reaction surface, assuming that the face plate 20 of FIG. 9 is to be operated in a clockwise direction.

In FIG. 6 removable jaws 208 and 210 have been associated with jaws A and C for facilitating alignment of the workpiece relative to the center of rotation of chuck body 20, in those instances wherein the end of the wabbler is not provided with a centering hole. The wabbler end will be initially centered by adjusting removable jaws X, Y, 208 and 210, and after the proper alignment has been obtained, removable jaws 100, 102, 104 and 106 are utilized for applying torque force to adapter element 90 as more fully set forth with reference to FIGS. 4 and 5.

From the foregoing, it will be noted that we have thus provided simple yet highly effective means applying a positive balanced drive to the splined end of a wabbler or a workpiece which is non-circular in section. By chucking at the greatest possible diameter the torsional forces are materially decreased and the adapter element and jaws are subjected to a minimum deflection.

It is to be understood that various modifications and changes may be made in the structural details of the device within the scope of the appended claims, without departing from the spirit of the invention.

What is claimed is:

1. The combination of a workpiece to be turned on a lathe and having a rotatable wabbler including opposed splines, and intervening opposed lugs each radially extended from an axis of rotation outwardly to a free end, each lug having a pair of sides one of which sides has a leading bearing area and the other of which has a trailing bearing area and both of which bearing areas are located near the free end of the lug, and apparatus to chuck said workpiece comprising, a lathe chuck body rotatable about an axis of rotation, a pair of movable clamping means at one side of the chuck body axis and a second pair of movable clamping means at the opposite side of the chuck body axis, each pair of clamping means being movable along a chord of a circle concentric with said axis to apply clamping force to a leading and a trailing bearing area of a wabbler lug in a direction normal to the direction of extension of the lug, and means carried by the chuck body for shifting the wabbler by application of forces to ends of the opposed lugs supported by the clamping means, to center the wabbler relative to the axis of rotation of the chuck body.

2. The combination of a workpiece to be turned on a lathe and having a rotatable wabbler including opposed splines, and intervening diametrically opposed lugs each radially extended from an axis of rotation outwardly to a free end, each lug having a pair of sides one of which sides has a leading bearing area and the other of which has a trailing bearing area and both of which bearing areas are located near the free end of the lug, and apparatus to chuck said workpiece comprising, a lathe chuck body rotatable about an axis of rotation, a pair of movable clamp jaws at one side of the chuck body axis and a second pair of movable clamp jaws at the opposite side of the chuck body axis, each pair of clamp jaws being shiftable along a path forming a chord of a circle concentric with said axis, which chords are substantially parallel to one another and equidistant from the chuck body axis, a pair of substantially U-shaped adapter elements each including a pair of spaced legs and a connecting portion, means securing each adapter to the body in straddling relation to a lug, said legs each having a free end including a bearing area, and a butt opposite the free end of each leg and means to advance the clamp jaws against the butts of both adapter elements, for projecting the bearing areas of the adapter element legs forcefully against the leading and trailing bearing areas of the diametrically opposed wabbler lugs, in opposite directions normal to the direction of lug extension.

3. The combination according to claim 2, wherein is included, means carried by the chuck body for shifting the wabbler by application of forces to the free ends of the diametrically opposed wabbler lugs, to center the wabbler relative to the axis of rotation of the chuck body.

4. The combination of a workpiece to be turned on a lathe and having a rotatable wabbler including opposed splines, and intervening diametrically opposed lugs each radially extended from an axis of rotation outwardly to a free end, each lug having a pair of sides one of which sides has a leading bearing area and the other of which has a trailing bearing area and both of which bearing areas are located near the free end of the lug, and apparatus to chuck said workpiece comprising, a lathe chuck body rotatable about an axis of rotation, and opposed movable clamp elements on said body shiftable against the lugs along paths forming chords of a circle concentric with said axis and which paths are substantially parallel to one another, and disposed at opposite sides of the axis of rotation of the chuck body at a distance from said axis approximating the distance of the leading and trailing bearing areas of the lugs from said axis of rotation and which define said circle, the direction of shifting of said clamp elements being substantially perpendicular to the direction of outward extension of the lugs, and adjustable means on the chuck body operative for shifting the workpiece bodily toward and from the axis of rotation of the chuck body transversely of the direction of shifting of the clamp elements.

5. The combination as set forth in claim 4, wherein the last mentioned means comprise diametrically opposed clamp elements shiftable radially of the chuck body to contact the free ends of the diametrically opposed lugs.

6. A lathe chuck for clamping a workpiece having an axis of rotation and a pair of rigid lugs extended radially outwardly from said axis, said chuck comprising a circular body having a face and an outer perimeter, and means for mounting the body concentrically upon a lathe spindle for rotation therewith, a set of four radial clamp jaws and means on the body for shifting the jaws toward and from the axis of the chuck body, two of said jaws being opposed along a vertical line, and the remaining two jaws being opposed along a horizontal line, and a second set of four offset clamp jaws including means to shift the jaws of said second set toward and from a vertical line passing through the chuck body axis of rotation, the four jaws of the second set being parallel to and laterally spaced from the horizontal jaws of the first set of jaws, with two jaws of the second set aligned with one another at one side of the horizontal jaws, and the remaining two jaws of the second set being aligned with one another at the opposite side of the horizontal jaws, the aligned jaws of the second set at opposite sides of the horizontal jaws being laterally spaced apart a distance approximating the span of the radially extended lugs of the workpiece.

7. A lathe chuck for clamping a workpiece having an axis of rotation and a pair of rigid lugs extended oppositely, radially outwardly from said axis, said chuck comprising a circular body having a face and an outer perimeter, and means for mounting the body concentrically upon a lathe spindle for rotation therewith, a set of four clamp jaws, and means on the body for advancing and retracting said jaws relative to the perimeter of the chuck body, two of said clamp jaws being aligned with one another to move along a path forming a chord of the circle defining perimeter of the body and at one side of the axis of the chuck body, and the remaining two clamp jaws being aligned with one another at the opposite side of said axis to move along a path forming a chord of said circle which is parallel to the first mentioned chord, the lateral distance between the first two aligned jaws and the second two aligned jaws being adjustable to space the same apart a distance approximately equal to the span of the radially extended lugs of the workpiece, and a pair of clamp elements carried by the chuck body and movable along a diameter of the chuck body to abut the ends of the lugs of a workpiece, said diameter being perpendicular to chords of a circular path along which the aforesaid clamp jaws are movable.

8. A lathe chuck for clamping a workpiece having an axis of rotation and a pair of rigid lugs extended oppositely, radially outwardly from said axis, said chuck comprising, a circular body having a face and an outer perimeter, and means for mounting the body concentrically upon a lathe spindle for rotation therewith, a set of four clamp jaws, and means on the body for advancing and retracting said jaws relative to the perimeter of the chuck body, two of said clamp jaws being aligned with one another to move along a path forming a chord of the circle defining perimeter of the body and at one side of the axis of the chuck body, and the remaining two clamp jaws being aligned with one another at the opposite side of said axis to move along a path forming a chord of said circle which is parallel to the first mentioned chord, a pair of adapter elements each comprising a substantially U-shaped plate having a pair of spaced legs extending in a common direction, said legs each having a free end, a butt end, and a connecting portion joining the butt ends of the two legs, the free ends of the legs being spaced to abut a leading bearing edge of one lug of a chucked, rotating workpiece and a trailing bearing edge of the other lug of such workpiece, the legs being at relatively widely radially spaced locations from the center of rotation of the workpiece, while the butts of the legs are in firm contact with the clamp jaws.

9. A lathe chuck as set forth in claim 8, wherein the chuck body carries a pair of clamp elements movable radially to abut the workpiece lugs butted by said legs and on a line perpendicular to the legs.

10. In combination, a lathe having a drive spindle and a chuck driven rotationally by the spindle, said chuck comprising a body having an outer circular perimeter and a center of rotation, a set of four clamp jaws mounted upon the body for advancing and retracting relative to the perimeter of the chuck body, two of said clamp jaws being aligned with one another to move along a path forming a chord of the circle defining perimeter of the body and at one side of the axis of the chuck body, and the remaining two clamp jaws being aligned with one another at the opposite side of said axis to move along a path forming a chord of said circle which is substantially parallel to the first mentioned chord, and means for advancing and retracting said jaws toward and from a diameter of the body which is perpendicular to the chords aforesaid.

11. The combination as set forth in claim 10, wherein along the diameter last mentioned, a pair of clamp elements is slidably mounted upon the chuck body for adjustment toward and from the center of rotation of the chuck body.

12. A lathe chuck for clamping a workpiece having an axis of rotation and a pair of rigid lugs extending radially outwardly from said axis, said chuck comprising a circular body having a face and an outer perimeter and means for mounting the body concentrically upon a lathe spindle for rotation therewith, said body having four radial sliding jaw slots in the face thereof, an elongate jaw slideably positioned in each slot, means adjacent to each jaw and operatively connected thereto for moving the jaw relative to the axis of the chuck body, two of said slots and the jaws therein being aligned in one radial direction and the remaining two slots and jaws being aligned at right angles to said one radial direction, a set of four offset sliding jaw slots in the face of said body, an elongate jaw slidably positioned in each of said offset slots, means adjacent to each of the jaws in the said offset slots for slidably adjusting the same, the said offset slots and jaws being parallel to and spaced from two aligned radial slots and jaws, two of said offset slots and jaws being aligned with one another at one side of the last said two aligned radial slots and jaws and the remaining two of said offset slots and jaws being aligned with one another at the opposite side of the last said two aligned radial slots and jaws, the said offset aligned slots and jaws at the opposite sides of the last said two aligned radial slots and jaws being spaced apart a distance approximating the span of the radially extended lugs of the workpiece, removable jaw elements, and means for securing said removable jaw elements upon the said offset slidable jaws.

13. A lathe chuck according to claim 12, wherein the last said means is a plural means facilitating the selective positioning of the removable jaw elements on the said offset slidable jaws.

14. A lathe chuck according to claim 12, with at least one adapter element and means for securing the adapter element to a slidable jaw positioned in a radial slot located between two spaced parallel offset slots, said adapter element being formed for interlocking connection with the radially extending lugs of the workpiece and having a width to overlie two adjacent parallel offset sliding jaws when attached to the intervening radial jaw.

References Cited by the Examiner

UNITED STATES PATENTS

| | | | |
|---|---|---|---|
| 621,022 | 3/1899 | Boal | 269—105 |
| 1,733,734 | 10/1929 | Hultgren | 269—152 |
| 2,396,841 | 3/1946 | Flygare | 51—237 |
| 2,543,117 | 2/1951 | Mackmann | 279—1.1 |
| 2,759,735 | 8/1956 | Cross | 279—110 |

FOREIGN PATENTS 256,589   12/1926   Great Britain

ROBERT C. RIORDON, *Primary Examiner.*